US012005693B2

(12) United States Patent
Song et al.

(10) Patent No.: US 12,005,693 B2
(45) Date of Patent: Jun. 11, 2024

(54) STONE PLASTIC COMPOSITE (SPC) FLOOR COMPRISING DECORATIVE SURFACE

(71) Applicant: FLOORING INDUSTRIES LIMITED, SARL, Bertrange (LU)

(72) Inventors: Jiangang Song, Zhejiang (CN); Jiajin Fu, Zhejiang (CN); Fuqing Liu, Zhejiang (CN)

(73) Assignee: UNILIN BV, Wielsbeke (BE)

( * ) Notice: Subject to any disclaimer, the term of this patent is extended or adjusted under 35 U.S.C. 154(b) by 0 days.

(21) Appl. No.: 17/781,192

(22) PCT Filed: Sep. 25, 2019

(86) PCT No.: PCT/CN2019/107796
§ 371 (c)(1),
(2) Date: Jun. 13, 2022

(87) PCT Pub. No.: WO2021/042425
PCT Pub. Date: Mar. 11, 2021

(65) Prior Publication Data
US 2023/0356502 A1    Nov. 9, 2023

(30) Foreign Application Priority Data

Sep. 3, 2019 (CN) .......................... 201910828033.8

(51) Int. Cl.
B32B 7/12           (2006.01)
B32B 9/00           (2006.01)
(Continued)

(52) U.S. Cl.
CPC ................ B32B 9/042 (2013.01); B32B 7/12 (2013.01); B32B 9/002 (2013.01); B32B 9/02 (2013.01);
(Continued)

(58) Field of Classification Search
CPC ......... H01L 21/02046; H01L 21/02395; H01L 21/02463; H01L 21/02543;
(Continued)

(56) References Cited

U.S. PATENT DOCUMENTS 5,925,211 A    7/1999  Rakauskas
7,597,947 B2  10/2009  Schuster
(Continued)

FOREIGN PATENT DOCUMENTS

CN    102561654 A    7/2012
CN    104309229 A    1/2015
(Continued)

OTHER PUBLICATIONS

Extended European Search Report from Corresponding European Patent Application No. EP 19944594.1, Oct. 24, 2023.
(Continued)

Primary Examiner — Lawrence D Ferguson
(74) Attorney, Agent, or Firm — Workman Nydegger

(57) ABSTRACT

A stone plastic composite (SPC) floor includes a decorative surface. The SPC floor has an SPC substrate and a decorative surface formed on the SPC substrate; the decorative surface is a wooden board or a bamboo board; the moisture content of the decorative surface is controlled within 5-7%. The SPC substrate is divided into an upper layer, a middle layer, and a lower layer, and the main components of the SPC substrate comprise polyvinyl chloride resin powder, calcium carbonate, a calcium-zinc stabilizer, an inner lubricant, PE wax, chlorinated polyethylene (CPE), acrylic ester (ACR), a composite lubricant, and a coloring agent. The SPC floor can ensure that the decorative surface does not wrap and deform, and other performances of the floor are not affected, and thus is low in costs.

9 Claims, 1 Drawing Sheet

(51) Int. Cl.
*B32B 9/02* (2006.01)
*B32B 9/04* (2006.01)
*B32B 21/14* (2006.01)
*B32B 37/12* (2006.01)
*B32B 38/00* (2006.01)
*C08L 27/06* (2006.01)
*E04F 15/04* (2006.01)
*E04F 15/10* (2006.01)

(52) U.S. Cl.
CPC .............. *B32B 9/04* (2013.01); *B32B 21/14* (2013.01); *B32B 37/12* (2013.01); *B32B 38/0012* (2013.01); *C08L 27/06* (2013.01); *E04F 15/043* (2013.01); *E04F 15/107* (2013.01); *B32B 2255/26* (2013.01); *B32B 2264/0257* (2013.01); *B32B 2264/104* (2013.01); *B32B 2307/4026* (2013.01); *B32B 2307/7376* (2023.05); *B32B 2310/0831* (2013.01); *B32B 2419/04* (2013.01); *C08L 2205/035* (2013.01)

(58) Field of Classification Search
CPC ........... H01L 21/02546; H01L 21/0262; H01L 21/02661; B32B 21/12; B32B 21/14; B32B 2255/04; B32B 2255/26; B32B 2264/0242; B32B 2264/0257; B32B 2264/104; B32B 2307/4026; B32B 2307/732; B32B 2307/7376; B32B 2310/0831; B32B 2419/04; B32B 2471/00; B32B 37/12; B32B 38/0012; B32B 5/16; B32B 5/30; B32B 7/12; B32B 9/002; B32B 9/02; B32B 9/04; B32B 9/042; B32B 21/08; B32B 2307/54; B32B 27/08; B32B 27/18; B32B 27/20; B32B 27/304; B32B 33/00; B32B 9/045; C08K 13/02; C08K 2003/265; C08K 3/04; C08K 5/005; C08K 5/09; C08K 5/098; C08K 3/26; C08L 2205/035; C08L 23/286; C08L 27/06; C08L 33/06; C08L 91/08; C08L 23/06; C08L 33/04; E04F 15/042; E04F 15/043; E04F 15/107; E04F 15/10; G01M 17/027
See application file for complete search history.

(56) References Cited

U.S. PATENT DOCUMENTS

| | | | |
|---|---|---|---|
| 10,213,989 B2 | 2/2019 | Chan | |
| 10,442,152 B2 | 10/2019 | Schulte | |
| 10,472,833 B2 | 11/2019 | Loncke et al. | |
| 10,576,715 B2 | 3/2020 | Bogner et al. | |
| 11,072,156 B2 | 7/2021 | Schulte | |
| 11,413,852 B2 | 8/2022 | Naeyaert et al. | |
| 11,680,414 B2 | 6/2023 | Cappelle | |
| 2003/0148135 A1 | 8/2003 | Ellstrom | |
| 2005/0136234 A1 | 6/2005 | Hak et al. | |
| 2006/0070325 A1 | 4/2006 | Magnusson | |
| 2007/0196676 A1 | 8/2007 | Schuster | |
| 2008/0261036 A1 | 10/2008 | Wu | |
| 2016/0375674 A1 | 12/2016 | Schulte | |
| 2017/0165936 A1 | 6/2017 | Schulte | |
| 2017/0183878 A1 | 6/2017 | Zhang et al. | |

FOREIGN PATENT DOCUMENTS

| | | |
|---|---|---|
| CN | 107627687 A | 1/2018 |
| CN | 107698192 A | 2/2018 |
| CN | 108019028 A | 5/2018 |
| CN | 108818858 A | 11/2018 |
| CN | 109797939 A | 5/2019 |
| CN | 110080492 A | 8/2019 |
| CN | 110128729 A | 8/2019 |
| DE | 10245914 A1 | 4/2004 |
| DE | 102007043202 A1 | 3/2009 |
| DE | 202013012020 A1 | 2/2015 |
| DE | 202013012020 U1 | 2/2015 |
| EP | 1761370 A1 | 3/2007 |
| EP | 1982832 A2 | 10/2008 |
| EP | 2065183 A1 | 6/2009 |
| EP | 2415947 A2 | 2/2012 |
| EP | 2902196 A1 | 8/2015 |
| JP | 2003053920 A | 2/2003 |
| KR | 100768517 B1 | 10/2007 |
| KR | 20090006503 A | 1/2009 |
| KR | 20120070704 A | 7/2012 |
| WO | 2009065769 A2 | 5/2009 |
| WO | 2009124704 A1 | 10/2009 |
| WO | 2011152787 A1 | 12/2011 |
| WO | 2015078443 A1 | 6/2015 |
| WO | 2015078444 A1 | 6/2015 |
| WO | 2016151435 A1 | 9/2016 |
| WO | 2022115462 A1 | 6/2022 |

OTHER PUBLICATIONS

International Search Report from corresponding PCT Application No. PCT/CN2019/107796, May 27, 2020.

International Preliminary Report on Patentability from corresponding PCT Application No. PCT/CN2019/107796, Mar. 8, 2022.

Wang Dongsheng, "Basic Knowledge of Building Decoration and Engineering", China University of Mining and Technology Press, Jul. 31, 2010, p. 181.

Shanghai Building Materials Industry Association, "Modern Household Decoration Handbook", Shanghai Science and Technology Education Press, Jul. 31, 2010, p. 85-86.

LV Zhidou, "Utilization Wide Spectrum Frequency Conversion Energy Conservation Technology", Lianoning Science and Technology Press, Jul. 31, 2010, p. 304.

STONE PLASTIC COMPOSITE (SPC) FLOOR COMPRISING DECORATIVE SURFACE

TECHNICAL FIELD

The present invention relates to the field of synthetic floors, and specifically relates to a stone plastic composite (SPC) floor comprising a decorative surface.

BACKGROUND ART

Production of ground decoration materials, including bamboo floors, solid wood floors or composite wood floors, requires the use of large amounts of natural bamboo and wood resources, so with increases in public requirements for environmental protection and in awareness about nature conservation, such use is restricted and has become more and more expensive, and, since large amounts of formaldehyde adhesives are used in the preparation process, a smell of formaldehyde may still be detected in the room even after use for a long time. On the other hand, after use for a long time, problems, such as deformation of the bottom board, will occur if there is damp, especially in the ground floors of one-storey houses and storied buildings, or seaside or lakeside houses, which become more serious in wet seasons.

To overcome the shortcomings of existing decorative materials, it is necessary to replace the above-described materials with novel ones. A novel alternative product has been introduced on the market: PVC stone plastic floor, which, comprising a substrate being a board made by mixing calcium powder and PVC, and a surface coated with a film and grooved, is a ground paving material and a high-quality, high-tech novel ground decoration material with superhigh wear resistance and a bright and nonslippery surface, and thus may be called a model high-tech new material for the twenty-first century. The surface of a PVC stone plastic substrate may be coated with a wooden veneer to give an appearance of solid wood, but the wooden veneer is prone to warping on the surface of the PVC stone plastic substrate, which results in a high defective rate during processing.

SUMMARY OF THE INVENTION

Technical Problem to Be Solved

In the existing stone plastic floor structure, a wooden veneer is prone to warping on the surface of the PVC stone plastic substrate, which results in a high defective rate during processing.

Solution to the Problem

Technical Solution

An objective of the present invention is to overcome the above-mentioned shortcomings of the existing stone plastic floor by providing a stone plastic composite (SPC) floor comprising a decorative surface, which can effectively solve the problem of deformation due to warpage.

The present invention adopts the following technical solution:
a stone plastic composite (SPC) floor comprising a decorative surface, the SPC floor comprising an SPC substrate and a decorative surface formed on the SPC substrate, the decorative surface being a wooden board or a bamboo board, the moisture content of the decorative surface being controlled within 5-7%.

In the above-described technical solution, the problem that the decorative surface is prone to warping on the surface of the stone plastic floor is solved by controlling the moisture content of the decorative surface.

Preferably, the main components of the SPC substrate comprise polyvinyl chloride resin powder, calcium carbonate, a calcium-zinc stabilizer, an inner lubricant, PE wax, chlorinated polyethylene (CPE), acrylic ester (ACR), a composite lubricant, and a coloring agent.

Preferably, the SPC substrate is divided into an upper layer, a middle layer, and a lower layer, wherein the components of the upper layer comprise 100 parts of polyvinyl chloride resin powder, 270-300 parts of calcium carbonate, 4-6 parts of calcium-zinc stabilizer, 0.5-1 part of inner lubricant, 0.6-1.0 part of PE wax, 2-5 parts of chlorinated polyethylene (CPE), 1-3 parts of acrylic ester (ACR), 0.5-1 part of composite lubricant, and 0.5-0.7 parts of coloring agent.

The components of the middle layer comprise 100 parts of polyvinyl chloride resin powder, 350-380 parts of calcium carbonate, 4-6 parts of calcium-zinc stabilizer, 0.5-0.8 parts of inner lubricant, 0.6-0.9 parts of PE wax, 2-4 parts of chlorinated polyethylene (CPE), 1-3 parts of acrylic ester (ACR), 0.5-0.8 parts of composite lubricant, and 0.5-0.7 parts of coloring agent.

The components of the lower layer comprise 100 parts of polyvinyl chloride resin powder, 270-300 parts of calcium carbonate, 4-6 parts of calcium-zinc stabilizer, 0.5-1 part of inner lubricant, 0.6-1.0 part of PE wax, 2-5 parts of chlorinated polyethylene (CPE), 1-3 parts of acrylic ester (ACR), 0.5-1 part of composite lubricant, and 0.5-0.7 parts of coloring agent.

Since the upper layer and the lower layer have the same compositions, having completely identical physical and chemical properties, when the substrate is subjected to extrusion or immersed in water or laminated with the decorative surface, warpage of the decorative surface may be better limited. In addition, use of the same compositions makes it more convenient to control the processing and production cost of the floor.

Preferably, the middle layer has a thickness of 1.5 mm-4 mm. The thickness of the middle layer is crucial to ensuring the support strength of the SPC substrate and the strength of the floor, but if the thickness exceeds 4 mm, the anti-warping effect will be affected.

Preferably, the upper layer has a thickness of 1.0 mm-2.0 mm, and the lower layer has a thickness of 1.0 mm-2.0 mm.

Preferably, the substrate has a total thickness of 4-7 mm.

Preferably, the decorative surface has a thickness of 0.5-1.5 mm.

Preferably, an adhesive layer is arranged between the decorative surface and the SPC substrate.

Preferably, the adhesive layer is formed using a cold glue polyurethane adhesive.

Preferably, the adhesive layer is formed by a roller coating and cold pressing process.

Preferably, the decorative surface is covered with a UV coating.

Further preferably, the UV coating is obtainable with an aqueous two-component polyurethane coating.

Preferably, to improve the sound-deadening performance of the floor, a sound-deadening layer may be glued to the back of the floor, the sound-deadening layer being made of organic polymer foam materials such as PE, EVA, and PU.

The present invention further provides a process for preparing a stone plastic composite (SPC) floor comprising a decorative surface as described above, the process comprising steps:

S-1. Preparing a SPC substrate board, and sanding the board to fix its thickness, thus obtaining a SPC substrate;

S-2. Laminating the decorative surface and the SPC substrate with cold glue, and performing cold pressing;

S-3. Performing surface sanding and wire drawing after the cold pressing; and

S-4. Subjecting the surface to UV treatment to obtain a finished product.

The SPC substrate board is formed by co-extrusion.

During co-extrusion of the SPC substrate board, the barrel temperature of the main engine is 170-210° C., the confluence core temperature is 140-180° C., the die temperature is 170-210° C., the speed of the main engine is 18-20 r/min, the feeding speed is 7-16 r/min, the extrusion speed is 1400-1500 mm/min, and the roller temperature is 175-200° C.

Beneficial Effects of the Invention

Beneficial Effects

By the above-described technical solution, the present invention has the following advantages: the floor obtained by means of the present invention ensures that the decorative surface does not warp or deform while other performances of the floor remain unaffected, and thus is low in costs.

BRIEF DESCRIPTION OF THE DRAWINGS

Description of the Drawings

Figure 1:
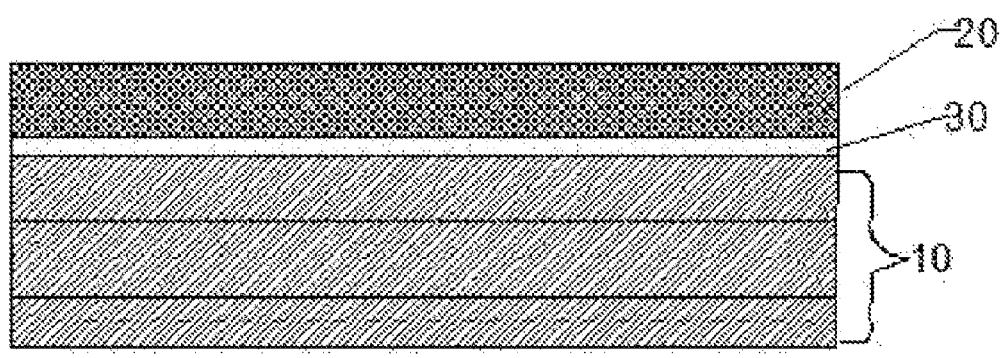
Figure 2:
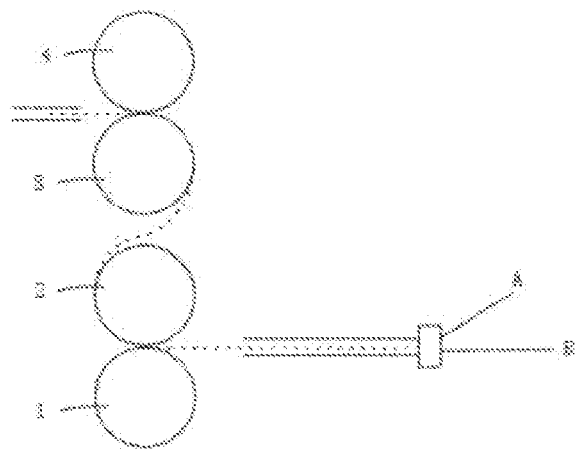

FIG. 1 is a schematic structural diagram of a floor obtained in one embodiment of the present invention;

FIG. 2 is a simplified schematic flow chart of preparing an SPC substrate board in one embodiment of the present invention.

PREFERRED EMBODIMENTS OF THE INVENTION

Preferred Modes of Implementing the Invention

Embodiment 1

A stone plastic composite (SPC) floor comprising a decorative surface, the floor comprises an SPC substrate 10, a decorative surface 20, and an adhesive layer 30 bonding the SPC substrate and the decorative surface, the decorative surface 20 being a wood board or a bamboo board, the moisture content of the decorative surface being controlled within 5-7%. The adhesive layer 30 was formed with a cold glue polyurethane adhesive by roller coating and cold pressing.

The SPC substrate was divided into an upper layer, a middle layer, and a lower layer, the main components of the upper layer and the lower layer comprising PVC resin powder and calcium carbonate, and the preferred compositions are listed in Table 1:

TABLE 1

Compositions of the upper and lower layers

| Material | Input amount in embodiment 1 | Input amount in embodiment 2 | Input amount in embodiment 3 | Comparative example 4 |
| --- | --- | --- | --- | --- |
| PVC resin powder | 100 kg | 100 kg | 100 kg | 100 kg |
| Calcium carbonate | 303 kg | 285 kg | 270 kg | 150 kg |
| Calcium-zinc stabilizer | 5 kg | 5 kg | 5 kg | 5 kg |
| Composite lubricant (LUBDE A380) | 0.8 kg | 0.8 kg | 0.7 kg | 0.8 kg |
| PE wax | 1 kg | 0.6 kg | 0.7 kg | 1 kg |
| Stearic acid SP60 | 0.8 kg | 0.5 kg | 0.8 kg | 0.8 kg |
| CPE | 5 kg | 4 kg | 3 kg | 15 kg |
| ACR | 2 kg | 2.5 kg | 1.5 kg | 2 kg |
| Carbon black (coloring agent) | 0.5 kg | 0.5 kg | 0.5 kg | 0.5 kg |

The main components of the middle layer comprised PVC resin powder and calcium carbonate, with the preferred compositions listed in Table 2:

TABLE 2

Compositions of the middle layer

| Material | Input amount in embodiment 1 | Input amount in embodiment 2 | Input amount in embodiment 3 | Comparative example 4 |
| --- | --- | --- | --- | --- |
| PVC resin powder | 100 kg | 100 kg | 100 kg | 100 kg |
| Calcium carbonate | 380 kg | 365 kg | 350 kg | 270 kg |
| Calcium-zinc stabilizer | 5 kg | 4 kg | 5 kg | 15 kg |
| Composite lubricant (LUBDE A380) | 0.8 kg | 0.7 kg | 0.6 kg | 0.8 kg |
| PE wax | 0.9 kg | 0.8 kg | 0.7 kg | 0.9 kg |
| Stearic acid SP60 | 0.6 kg | 0.7 kg | 0.7 kg | 0.6 kg |
| CPE | 4 kg | 3 kg | 3.5 kg | 4 kg |
| ACR | 2 kg | 2 kg | 15 kg | 2 kg |

The SPC substrate had the components listed in Tables 1-2.

In the present embodiment, as shown in FIG. 2, the method for manufacturing the floor comprised first feeding raw materials into extruder A according to the materials and input amounts listed in Table 1; and then feeding raw materials into extruder B according to Table 2. Extruder A extruded the upper and lower layers of equal mass and equal thickness at the same time, and extruder B extruded the middle layer. Then, the extrudate entered the runner distributor of the die, so that the middle layer was located between the upper layer and the lower layer, and then it entered the die orifice for extrusion into an SPC substrate. The middle layer had a thickness of 4 mm. The upper and lower layers had the same thickness of 1.0 mm.

Each extruder had a main engine barrel temperature of 200-210° C., a confluence core temperature of 160-180° C., a die temperature of 200-210° C., a main engine speed of 18-20 r/min, a feeding speed of 7-16 r/min, an extrusion speed of 1400-1450 mm/min, and a roller temperature of 175-180° C.

Thus, there was no adhesive between the upper, middle and lower layers. The board ejected from the die was pressed between a shading roller 1 and a mirror roller 2 to form shade, and the substrate was conveyed to extrusion between a mirror roller 3 and an embossing roller 4 to eject a board, which was shaped, cooled, cut, and shaped to obtain a stone plastic composite (SPC) substrate. Thus, there was no adhesive between the three layers, which is more environmentally friendly and reduces the cost of floor production.

The method for manufacturing the bamboo veneer (wooden veneer) was as follows: the bottom surface of the bamboo veneer (wooden veneer) was sanded with a 120-150 mesh sand belt until the surface became smooth and was moved into a kiln, the kiln entrance was closed for stepped heating, the heating continued after the temperature had been kept at 35° C. for 10 hours, the temperature needed to reach 50° C. within 24 hours, when the temperature had reached 50° C., spraying was performed for 3 hours, so that the humidity had a difference of 3 percent with the temperature, then, an equilibrium was maintained for 24 hours at 50° C., so that the humidity fell to have a difference of 10 percent with the temperature, then, spraying was performed for 3 hours at 50° C., so that the humidity had a difference of 5 percent with the temperature, an equilibrium was maintained for 60 hours at 50° C., so that the humidity fell to have a difference of 10 percent with the temperature, until a spot check showed that the oven-dry moisture content had reached the moisture content required for a slab, with the moisture content controlled within 5-7%. The decorative surface had a thickness of 0.5 mm-1.5 mm.

The SPC substrate and the decorative layer needed to be compounded by glue. In this embodiment, the glue is preferably cold glue polyurethanes, and Polyurethane Reactive (PUR) may also be used. The cold glue compounding process parameters of the process for laminating the SPC substrate and the decorative layer are listed in Table 3.

TABLE 3

Cold glue compounding process parameters of the process for laminating the SPC substrate and decorative layer

| Key point in process | Ratio of curing agent to glue | Glue temperature/ ° C. | Glue amount/ (g/m$^2$) | Roller coating temperature/ ° C. |
|---|---|---|---|---|
| Process requirement | 1:5 | 20-30 | 138-170 | 20-30 |

A polyisocyanate curing agent was used as the curing agent.

The process parameters for cold pressing the SPC substrate and the decorative layer are listed in Table 4.

TABLE 4

Process parameters for cold pressing the SPC substrate and the decorative layer

| Key point in process | Unit pressure | Temperature/° C. | Cold pressing time |
|---|---|---|---|
| Process requirement | 1.5 MPa/cm$^2$ | 25-30 | 6 h |

SPECIFIC EMBODIMENTS

Embodiments of the Invention

Embodiment 2

This embodiment differed from embodiment 1 in the compositions of the upper layer, the middle layer, and the lower layer, details of which are listed in Tables 1-2. Each extruder had a main engine barrel temperature of 170-180° C., a confluence core temperature of 140-150° C., a die temperature of 170-210° C., a main engine speed of 18-20 r/min, a feeding speed of 7-16 r/min, an extrusion speed of 1400-1500 mm/min, and a roller temperature of 175-200° C. The middle layer had a thickness of 3 mm. The upper and lower layers had the same thickness of 1.5 mm.

Embodiment 3

This embodiment differed from embodiment 1 in the compositions of the upper layer, the middle layer, and the lower layer, details of which are listed in Tables 1-2. Each extruder had a main engine barrel temperature of 180-190° C., a confluence core temperature of 140-180° C., a die temperature of 180-190° C., a main engine speed of 18-20 r/min, a feeding speed of 7-16 r/min, an extrusion speed of 1500 mm/min, and a roller temperature of 180-185° C.

The invention claimed is:
1. A stone plastic composite (SPC) floor comprising a decorative surface, wherein the SPC floor comprises an SPC substrate and a decorative surface formed on the SPC substrate, the decorative surface is a wooden board or a bamboo board, and a moisture content of the decorative surface is controlled within 5-7%;
 wherein an adhesive layer is arranged between the decorative surface and the SPC substrate;
 wherein the adhesive layer is a cold glue;
 wherein a bottom surface of the SPC floor is defined by the SPC substrate or by a sound-deadening layer glued to the bottom surface of the SPC substrate.

2. The stone plastic composite (SPC) floor of claim 1, wherein the main components of the SPC substrate comprise polyvinyl chloride resin powder, calcium carbonate, a calcium-zinc stabilizer, an inner lubricant, PE wax, chlorinated polyethylene (CPE), acrylic ester (ACR), a composite lubricant, and a coloring agent.

3. The stone plastic composite (SPC) floor of claim 2, wherein the SPC substrate is divided into an upper layer, a middle layer, and a lower layer,
wherein components of the upper layer comprise 100 parts of polyvinyl chloride resin powder, 270-300 parts of calcium carbonate, 4-6 parts of calcium-zinc stabilizer, 0.5-1 part of inner lubricant, 0.6-1.0 part of PE wax, 2-5 parts of chlorinated polyethylene (CPE), 1-3 parts of acrylic ester (ACR), 0.5-1 part of composite lubricant, and 0.5-0.7 parts of coloring agent;
wherein the components of the middle layer comprise 100 parts of polyvinyl chloride resin powder, 350-380 parts of calcium carbonate, 4-6 parts of calcium-zinc stabilizer, 0.5-0.8 parts of inner lubricant, 0.6-0.9 parts of PE wax, 2-4 parts of chlorinated polyethylene (CPE), 1-3 parts of acrylic ester (ACR), 0.5-0.8 parts of composite lubricant, and 0.5-0.7 parts of coloring agent;
wherein the components of the lower layer comprise 100 parts of polyvinyl chloride resin powder, 270-300 parts of calcium carbonate, 4-6 parts of calcium-zinc stabilizer, 0.5-1 part of inner lubricant, 0.6-1.0 part of PE wax, 2-5 parts of chlorinated polyethylene (CPE), 1-3 parts of acrylic ester (ACR), 0.5-1 part of composite lubricant, and 0.5-0.7 parts of coloring agent.

4. The stone plastic composite (SPC) floor of claim 2, wherein the middle layer has a thickness of 1.5 mm-4 mm.

5. The stone plastic composite (SPC) floor of claim 4, wherein the substrate has a total thickness of 4-7 mm.

6. The stone plastic composite (SPC) floor of claim 1, wherein the decorative surface has a thickness of 0.5-1.5 mm.

7. The stone plastic composite (SPC) floor of claim 3, wherein the SPC substrate board is formed by co-extrusion.

8. The stone plastic composite (SPC) floor of claim 1, wherein the adhesive layer is formed by a roller coating and cold pressing process.

9. A process for preparing the stone plastic composite (SPC) floor of claim 1, comprising the steps:
preparing a SPC substrate board, and sanding the board to fix its thickness, thus obtaining a SPC substrate;
laminating the decorative surface and the SPC substrate with the cold glue, and performing cold pressing;
performing surface sanding and wire drawing after the cold pressing; and
subjecting the surface to UV treatment to obtain a finished product.

* * * * *